United States Patent [19]

Crowe et al.

[11] Patent Number: 4,905,517
[45] Date of Patent: Mar. 6, 1990

[54] MULTICOMPONENT TRANSDUCER

[75] Inventors: Christopher Crowe; Ralph L. Cordell, both of Tulsa; Seun K. Kahng, Norman, all of Okla.

[73] Assignee: Amoco Corporation, Chicago, Ill.

[21] Appl. No.: 239,367

[22] Filed: Aug. 31, 1988

[51] Int. Cl.⁴ .......................................... G01P 15/125
[52] U.S. Cl. .................................... 73/654; 73/516 R
[58] Field of Search ................ 73/516 R, 516, 517 R, 73/517 B; 71/516 R, 516 LM, 517 R, 517 B

[56] References Cited

U.S. PATENT DOCUMENTS

| | | | |
|---|---|---|---|
| 3,488,531 | 1/1970 | Rosensweig | 310/10 |
| 3,508,445 | 4/1970 | Penney, Jr. et al. | 73/517 |
| 3,516,294 | 6/1970 | Schmieder | 73/516 |
| 3,902,374 | 9/1975 | Hoffman et al. | 73/517 AV |
| 4,043,204 | 8/1977 | Hunter et al. | 73/516 R |
| 4,047,439 | 9/1977 | Russell et al. | 73/516 R |
| 4,583,207 | 4/1986 | Greer, Jr. | |

FOREIGN PATENT DOCUMENTS 1229406 11/1987 Canada .
605180 4/1978 U.S.S.R. .

OTHER PUBLICATIONS

Rosensweig, R. E., "Ferrohydrodynamics", Cambridge University Press, (1985).
Rosensweig, R. E., et al., "Ferrohydrodynamic Sensor Development", Air Force Flight Dynamics Laboratory Technical Report TR-67-162, (1968).
Rosensweig, R. E., "Fluid Dynamics and Science of Magnetic Liquids" Advances in Electronics and Electron Physics, vol. 48, pp. 103-179, (1979).
Hugo, G. R., et al., "Impedance Changes in a Coil Due to a Nearby Small Conducting Sphere" Journal of Phys. D: Appl. Phys. 21, (1988), pp. 33-38.

*Primary Examiner*—Hezron E. Williams
*Assistant Examiner*—Mark A. Spector
*Attorney, Agent, or Firm*—Timothy D. Stanley

[57] ABSTRACT

The multicomponent transducer of the present invention comprises a housing having interior surfaces forming an enclosed cavity and a single inertial mass immersed in a magnetic fluid contained therein. The inertial mass is levitated in the magnetic fluid by means of ferrohydrodynamic forces. The housing cavity and the inertial mass are generally spherical in shape such that the inertial mass is substantially unconstrained with respect to the directions of motion to which it is responsive. The multicomponent transducer also includes motion sensing means for sensing selected components of motion of the inertial mass and for generating signals representative of the magnitude and periodicity of the relative motion of the inertial mass with respect to the housing along one or more separate axes. The multicomponent transducer of the present invention has amplitude and phase responses similar to those of conventional transducers.

36 Claims, 9 Drawing Sheets

FIG.12

MULTICOMPONENT TRANSDUCER

BACKGROUND OF THE INVENTION

The present invention relates generally to transducers for sensing vibrations. More particularly, a multicomponent transducer has been developed employing a single inertial mass to sense one or more components of seismic disturbances in the earth and to generate signals representative of the magnitude and periodicity thereof.

In seismic reflection and refraction investigations, exploration geophysicists and earth seismologists have used transducers to sense the earth's response to seismic energy generated by seismic sources (e.g., explosives, vibrators, impulsive sources, etc.) as well as seismic energy generated by natural phenomena (e.g., earthquakes). Such transducers comprise geophones and seismometers having sensing elements which have been generally constrained to linear motion. Typically, such sensing elements include a single spring-mounted inertial mass ideally constrained to linear motion along a selected axis. However, such sensing elements cannot truly be constrained to linear motion along the selected axis. Rather, the motion of the inertial mass can be affected by motion along axes other than that prescribed. Consequently, signals generated by such transducers (which are intended to be representative of the motion of the inertial mass along the constrained axis only) can be contaminated by signal components due to motions along other axes and can thus be misleading.

Alternative transducers have been described by Russell, et al., in U.S. Pat. No. 4,047,439; by Hunter, et al., in U.S. Pat. No. 4,043,204; by Lister in Canadian Pat. No. 1,229,406; and by Rosensweig in U.S. Pat. No. 3,488,531. Such transducers all employ a ferrohydrodynamically levitated single inertial mass generally constrained to linear motion along a selected axis. These levitated inertial mass transducers suffer from the same shortcomings of the spring-mounted masses sensing systems, i.e., each attempts to develop signals representative of linear motion of an inertial mass which has been generally constrained to motion along a single axis but which is nonetheless affected by motion from all other directions. Hence, the signals generated by such transducers can be contaminated by signal components due to motion from all other directions.

As a result of recent advances in seismic reflection and refraction investigations of the earth, geophysicists and seismologists have begun to sense and record multiple components of the earth's response to seismic energy. Such investigations have employed two or more separate transducers, each generally responsive to ground motion along one axis, at each recording station or a single geophone having two or more spring-mounted inertial masses, wherein each inertial mass is generally responsive to the ground motion along one axis, at each recording location. Regardless of the nature of the transducers employed, the signals generated by such transducers can be contaminated by signal components due to ground motion from all directions.

Because of the recent advances in seismic reflection and refraction investigations in sensing and recording multiple components of the earth's response to generated seismic energy, it is highly desirable to obtain seismic signals which more truly represent the earth's response to the imparted seismic energy along selected axes. The multicomponent transducer of the present invention can develop one or more signals, each representative of a component of ground motion along a separate axis, from a single inertial mass which are more truly representative of the components of ground motion along such separate axes.

SUMMARY OF THE INVENTION

The multicomponent transducer of the present invention comprises a single inertial mass responsive to omnidirectional motion and a motion sensing system adapted to sense one or more components of such omnidirectional motion and to generate signals representative of the magnitude and periodicity thereof.

The multicomponent transducer includes a housing having an enclosed cavity filled with a magnetic fluid and an inertial mass immersed therein. By the application of a magnetic field on the magnetic fluid, the inertial mass can be levitated about an equilibrium position. Both the inertial mass and the enclosed cavity of the housing are preferably spherical in shape such that the inertial mass is substantially unconstrained with respect to the directions of motion to which it can respond. The motion sensing system includes means for detecting changes in capacitance along selected axes resulting from motion of the inertial mass relative to the housing. Such changes in capacitance can be transformed into signals representative of the magnitude and periodicity of the components of relative motion of the inertial mass along each axis. The applied magnetic field is radially symmetric, at least along the selected axes, so that the amplitude and phase responses of the multicomponent transducer can be substantially the same along those axes, and the changes in capacitance associated with each axis can be directly compared.

By allowing the inertial mass to oscillate substantially unconstrained in response to omnidirectional motion and sensing only those components of the omnidirectional motion of interest, one can generate signals representative of selected components of motion which are more truly representative of only the desired components of motion. These and other benefits of the multicomponent transducer will be apparent to those skilled in the art from the figures and description of the present invention.

DETAILED DESCRIPTION OF THE INVENTION

The present invention relates generally to transducers for sensing vibrations and generating signals representative of the magnitude and periodicity thereof.

In order to better understand the present invention, the following brief discussion is provided. A body can be levitated by employing ferrohydrodynamic forces. The nature of such ferrohydrodynamic forces can best be understood with the following simple example. By immersing a body into a magnetic fluid (e.g., a colloidal suspension of fine magnetic particles in a carrier liquid) and by imposing a magnetic field on the magnetic fluid, a distribution of ferrohydrodynamic forces (magnetic fluid pressure) on the body can be created which causes the body to be levitated about an equilibrium position. The body is said to be levitated because the ferrohydrodynamic forces and the gravitational force acting on the body are balanced. For the purpose of explanation, the imposed magnetic field can be supplied by external means such as one dipole magnetic field developed by one bar magnet, or two opposing dipole magnetic fields developed by opposing bar magnets. The concept of ferrohydrodynamic forces is more completely described by Rosensweig in "Ferrohydrodynamics," Cambridge Univ. Press (1985), and by Rosensweig, et al. in "Fluid Dynamics and Science of Magnetic Liquids," Advances in Electron Physics, vol. 48, pp. 103–179 (1973), and "Ferrohydrodynamic Sensor Development," Air Force Flight Dynamics Laboratory Technical Report TR-67-162 (1968), all of which are incorporated by reference herein.

The multicomponent transducer of the present invention comprises a housing having a generally enclosed cavity filled with a magnetic fluid and a single inertial mass immersed in the magnetic fluid-filled housing cavity. In a preferred embodiment, both the inertial mass and the housing cavity have a generally spherical shape such that the inertial mass is substantially unconstrained with respect to the directions of motion to which it is responsive. The inertial mass is ferrohydrodynamically levitated in the magnetic fluid about an equilibrium position by the application of a magnetic field on the magnetic fluid in which the inertial mass is immersed. Preferably, the applied magnetic field is radially symmetric, at least along selected axes, so that the amplitude and phase responses of the multicomponent transducer are substantially the same along the selected axes. The multicomponent transducer also includes a motion sensing system mounted with the housing for sensing motion of the inertial mass relative to the housing and for generating signals representative of the magnitude and periodicity of the relative motion of the inertial mass with respect to the housing along one or more of the selected axes.

Since the inertial mass is levitated about an equilibrium position fixed relative to the housing of the multicomponent transducer, vibrations acting on the multicomponent transducer can cause the inertial mass to be displaced from its equilibrium position relative to the housing. Moreover, displacement of the inertial mass from its equilibrium position can induce a restoring ferrohydrodynamic force proportional to such displacement. Thus, an oscillating motion can be imparted to the inertial mass which can be related to the amplitude and frequency of the vibrations acting on the transducer. The oscillations tend to be damped by the flow of the magnetic fluid in the annulus between the inertial mass and the housing cavity wall. Displacement of the inertial mass from its equilibrium position can also cause changes in the capacitance between electrodes on the inertial mass and the housing. By including a motion sensing system for sensing such changes in capacitance, one can generate signals representative of the magnitude and periodicity of the motion of the inertial mass relative to the housing and hence of the vibrations acting on the multicomponent transducer.

The use of ferrohydrodynamic forces to levitate the inertial mass combines certain of the properties of a spring suspension system and those of frictionless gimbles. Consequently, the multicomponent transducer of the present invention can have amplitude and phase responses similar to those of conventional transducers. The similarity occurs because the ferrohydrodynamic forces acting on the inertial mass have generally the same effect as the spring in conventional transducers. Although the magnetic fluid generates a damping force acting on the inertial mass, this damping force is not simply related to the relative velocity between the inertial mass and the housing, as in conventional transducers, but to a more complicated relationship between the velocities of the inertial mass and the housing, the magnetic fluid viscosity, and the radii of the inertial mass and housing cavity.

Figure 1:
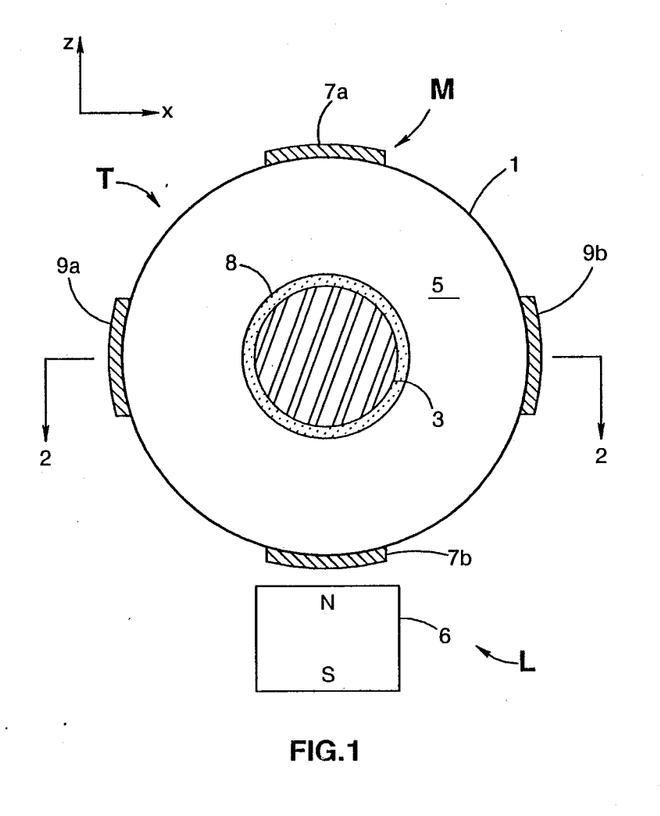
FIG. 1 is a cross-sectional representation of a multicomponent transducer.
Figure 2:
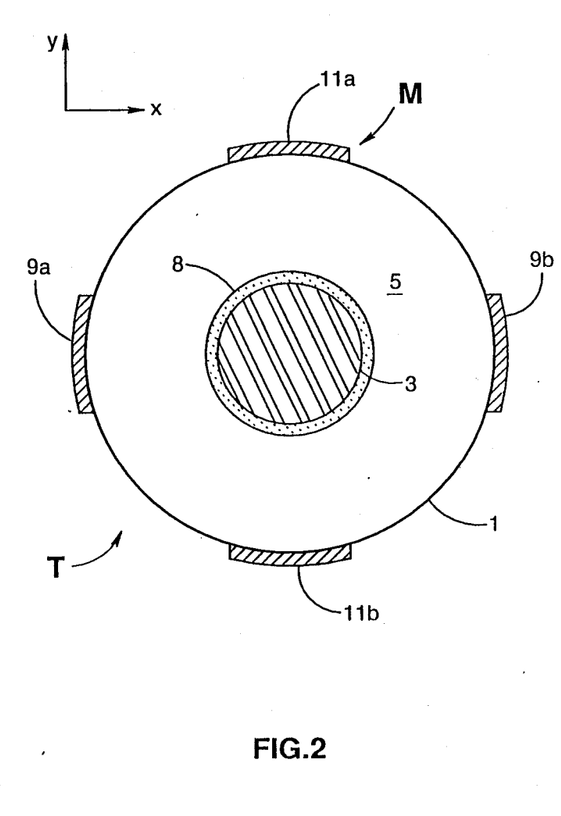
FIG. 2 is a cross-sectional representation of the multicomponent transducer of FIG. 1 along section line 2—2.

Looking now to FIGS. 1 and 2, one embodiment of a multicomponent transducer T according to the present invention will now be described in more detail. FIGS. 1 and 2 are separate cross-sectional views of the multicomponent transducer T. FIG. 1 depicts a cross-sectional view of the multicomponent transducer T taken along the Z and X axes of an XYZ coordinate system. FIG. 2 depicts a cross-sectional view of the multicomponent transducer T taken along the X and Y axes of the XYZ coordinate system. More particularly, FIG. 2 is a cross-sectional view of the multicomponent transducer T taken along section line 2—2 in FIG. 1.

The multicomponent transducer T comprises a housing 1 having an interior surface forming an enclosed cavity 5 of generally spherical shape and radius R. It is preferable that the housing 1 be made of a nonmagnetic, nonconductive material. An inertial mass 3 is immersed in a magnetic fluid (not indicated by number) filling the cavity 5. The inertial mass 3 can be made from a nonmagnetic and nonconductive material (e.g., Teflon® or Lucite®) having a density greater than the density of the magnetic fluid. The inertial mass 3 is generally spherical in shape having a radius r. Consequently, the inertial mass 3 can be substantially unconstrained with respect to the directions of motion to which it is responsive while levitated in cavity 5.

A magnetic system L is provided with the multicomponent transducer T to levitate the inertial mass 3 about an equilibrium position within the magnetic fluidfilled cavity 5. For ease of demonstration only, the magnetic system L is represented in FIG. 1 as a dipole bar magnet 6 although other means can be used (as will be discussed later) to impose a magnetic field on the magnetic fluid and which develop a magnetic field of minimum or maximum strength within the cavity 5. Preferably, the magnetic system L should generate a radial symmetric magnetic field, at least along selected axes. By not constraining the directions of motion to which the inertial mass 3 can respond and by imposing a radially symmetric magnetic field on the magnetic fluid, the amplitude and phase responses of the multicomponent transducer T can be symmetrical, i.e., they are generally the same for all directions of motion of the inertial mass 3 within cavity 5, or at least along selected axes.

Since the magnetic system L is mounted with the housing 1, the equilibrium position of the levitated inertial mass 3 resulting from a balancing of the gravitational force and the ferrohydrodynamic forces is fixed relative to the housing 1. Consequently, as the multicomponent transducer T oscillates due to vibrations, the equilibrium position oscillates. The inertial mass 3 attempts to track the equilibrium position due to the restoring force described earlier, but due to its inertia, the inertial mass 3 cannot keep up with it. As a result, there is relative motion between the housing 1 and inertial mass 3. A motion sensing system M with the multicomponent transducer T is adapted to sense such relative motion and generate signals representative of the magnitude and periodicity of selected components of such relative motion.

The motion sensing system M with the housing 1 comprises a plurality of pairs of circular electrodes (7a, 7b; 9a, 9b; and 11a, 11b) adapted to sense the displacement of the inertial mass 3 from its equilibrium position along three separate axes (e.g., X, Y and Z) of the multicomponent transducer T. Although orthogonal axes X,Y,Z have been shown, those skilled in the art will appreciate that such choice is merely exemplary. The inertial mass 3 is coated with a metallic coating 8 over substantially its entire surface. The metallic coating 8 on the inertial mass 3 comprises an electrode which is common to the plurality of circular electrodes with the housing 1. The motion sensing system M detects changes in capacitance between the metallic coating 8 and the circular electrodes resulting from relative motion of the inertial mass 3.

As further depicted in FIGS. 1 and 2, circular electrodes 9a and 9b comprise a first pair of capacitance sensors mounted on opposing sides of housing 1 along the X axis. The electrodes 9a and 9b are adapted to sense changes in capacitance $C_x(t)$ as a function of time resulting from a component of relative motion of the metal-coated inertial mass 3 along the X axis. Similarly, circular electrodes 11a and 11b comprise a second pair of capacitance sensors mounted on opposing sides of housing 1 along the Y axis. The electrodes 11a and 11b are adapted to sense changes in capacitance $C_y(t)$ resulting from a component of relative motion of the metal-coated inertial mass 3 along the Y axis. Additionally, circular electrodes 7a and 7b comprise a third pair of capacitance sensors mounted on opposing sides of housing 1 along the Z axis. The electrodes 7a and 7b are adapted to sense changes in capacitance $C_z(t)$ resulting from a component of relative motion of the metal-coated inertial mass 3 along the Z axis. Each electrode can include a wire (not shown) for conveying signals representative of changes in capacitance measured by each pair of electrodes to circuit means for transforming such changes in capacitance into signals representative of the magnitude and periodicity of the relative motion of the inertial mass 3 along the selected axes.

Figure 3:
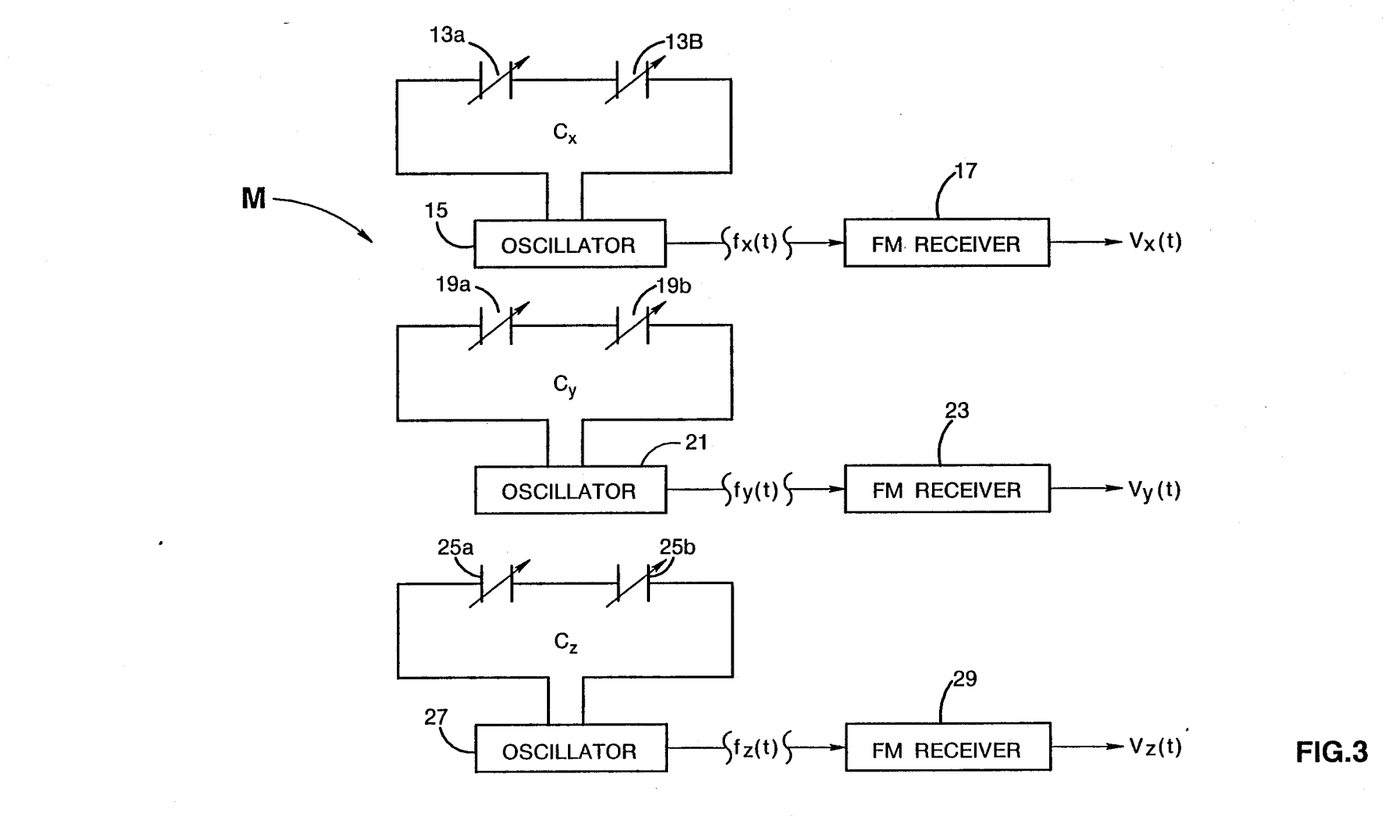
FIG. 3 includes circuit diagrams for transforming changes in capacitance sensed in the multicomponent transducer into signals representative of the magnitude and periodicity of the motion of the inertial mass.

Looking now to FIG. 3, the motion sensing system M can include circuit means $C_x$, $C_y$, and $C_z$ for transforming the time-varying capacitances $C_x(t)$, $C_y(t)$ and $C_z(t)$ sensed by the pairs of electrodes 9a, 9b; 11a, 11b; and 7a, 7b, respectively, into time-varying voltage signals representative of the magnitude and periodicity of the components of relative motion of the metal-coated inertial mass 3 along three separate axes. In particular, a first circuit labeled $C_x$ is adapted to transform the changing capacitance $C_x(t)$ sensed by the pair of electrodes 9a, 9b. Within circuit $C_x$, first and second capacitors 13a and 13b are representative of the capacitance between the metal-coated inertial mass 3 and each of the electrodes 9a, 9b and hence of changing capacitance $C_x(t)$ sensed by the pair of electrodes 9a, 9b. Also included in the circuit $C_x$ is an oscillator 15 for transforming the time-varying capacitance $C_x(t)$ into a time-varying measure of frequency $f_x(t)$ and thence to a FM receiver 17 whereby a time-varying voltage $V_x(t)$ can be produced which is representative of the magnitude and periodicity of the relative motion of the metal-coated inertial mass 3 along a first axis (e.g., X axis). Similarly, second and third circuits $C_y$ and $C_z$ are adapted to transform the changing capacitances $C_y(t)$ and $C_z(t)$ sensed by the pairs of electrodes 11a, 11b and 7a, 7b, respectively, into signals representative of the magnitude and periodicity of the relative motion of the metal-coated inertial mass 3 along the Y and Z axes. The circuits $C_y$ and $C_z$ include capacitors 19a, 19b, and 25a, 25b, representative of the capacitances between the metal-coated inertial mass 3 and the electrodes 11a, 11b and 7a, 7b, and hence of the changing capacitances $C_y(t)$ and $C_z(t)$ sensed by the pairs of electrodes 11a, 11b and 7a, 7b respectively. In the second circuit $C_y$, an oscillator 21 transforms the time-varying capacitance $C_y(t)$ into a time-varying measure of frequency $f_y(t)$ and thence to a FM receiver 23 whereby a time-varying voltage $V_y(t)$ can be produced which is representative of the magnitude and periodicity of the relative motion of the metal-coated inertial mass 3 along a second axis (e.g., Y-axis). Additionally in the third circuit $C_z$, an oscillator 27 is provided for transforming the time-varying capacitance $C_z(t)$ into a time-varying measure of frequency $f_z(t)$ and thence to a FM receiver 29 whereby a time-varying voltage $V_z(t)$ can be produced which is representative of the magnitude and periodicity of the relative motion of the metal-coated inertial mass 3 along the third axis, (e.g., Z-axis). It is understood that circuit means, such as $C_x$, $C_y$ and $C_z$, can be mounted either with or separate from the multicomponent transducer T.

The circuits $C_x$, $C_y$ and $C_z$ of FIG. 3 are merely exemplary of circuit means for transforming the time-varying capacitance sensed by the motion sensing system M into signals representative of the magnitude and periodicity of components of the relative motion of the inertial mass 3 along separate axes. A phase locked loop could replace the FM receiver 23. Additionally, Hugo et al., describe in an article entitled "Impedance Changes in a Coil Due to a Nearby Small Conducting Sphere," Journal of Physics (Applied Physics), Vol 21, No. 1 p. 33 (1988), alternative means for sensing motion of the inertial mass 3 and generating signals representative of the magnitude and periodicity of components of the relative motion of the inertial mass 3 along separate axes.

One-Component Test

A prototype, one-component transducer $T_1$ was constructed to evaluate the sensitivity of the motion sensing system M described above for sensing motion of an inertial mass generally along a single axis and generating signals representative of the magnitude and periodicity thereof.

Figure 4A:
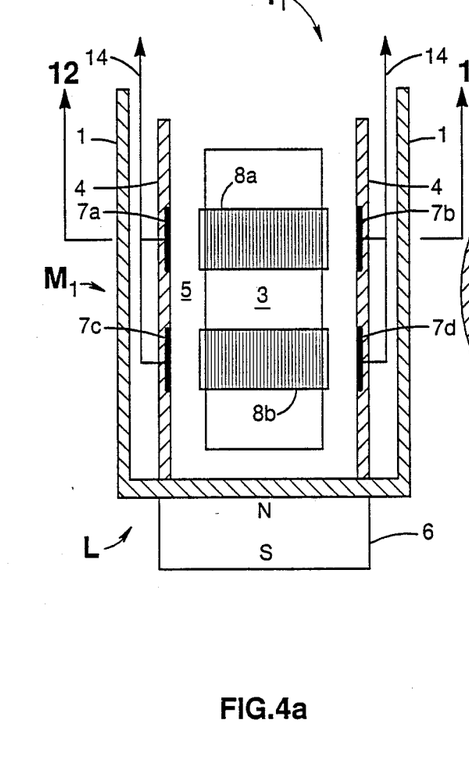
FIGS. 4a and 4b represent a side view and a cross-sectional view of a prototype one-component transducer.
Figure 4B:
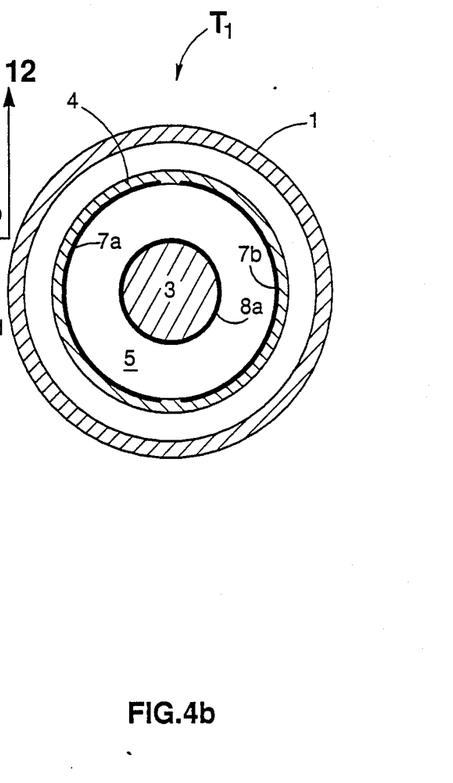

FIG. 4a depicts a side view and FIG. 4b depicts a cross-sectional view of the one-component transducer $T_1$ along section line 12—12 of FIG. 4a. The prototype, one-component transducer $T_1$, comprises a cylindrical housing 1 having a generally cylindrical cavity 5 filled with a magnetic fluid, an inertial mass 3 having a generally cylindrical shape so that it is generally constrained to linear motion along the longitudinal (vertical) axis of cavity 5, and a one component motion sensing system $M_1$ for sensing motion relative to the housing of the inertial mass 3 and for generating signals representative of the magnitude and periodicity of the relative motion of the inertial mass 3 generally along the longitudinal axis of the housing 1. A magnetic system L used for levitating the inertial mass 3 includes a dipole magnet 6.

The motion sensing system $M_1$ includes first pairs of rectangular electrodes 7a, 7b, mounted on opposing sides of cylindrical sleeve 4 which in turn is mounted with the housing 1. The electrodes 7a, 7b of the motion sensing system $M_1$ could have been mounted directly with housing 1 itself; however, mounting them with the sleeve 4 facilitated construction of the one-component prototype $T_1$.

A metal ring 8a is mounted circumferentially with the inertial mass 3 such that the relative longitudinal motion between the inertial mass 3 and the electrodes 7a, 7b alters the capacitance sensed by electrodes 7a, 7b. By connecting electrodes 7a, 7b with connector 14 to an oscillator circuit and utilizing an FM receiver as shown in FIG. 3, the time-varying capacitance can be converted to a time-varying voltage representative of the magnitude and periodicity of the relative motion of the inertial mass 3.

By providing a second pair of outer electrodes 7c, 7d mounted on opposing sides of sleeve 4 and connecting them in parallel with the first pair, 7a, 7b, as well as a second ring 8b around the inertial mass 3, the sensitivity of the motion sensing system $M_1$ can be increased.

The one-component transducer $T_1$ was mounted with a vertical shake table and the shake table was driven sinusoidally at frequencies in the range 20–47 Hz, at an amplitude of approximately $5 \times 10^{-5}$ in peak-to-peak (p-t-p). The lowest shake table amplitude, due to a limitation in design of the shake table used, detected by the motion sensing system $M_1$ was $2 \times 10^{-5}$ in p-t-p. Below this amplitude, the shake table motion was not cyclic and could not be correlated with the motion sensing system $M_1$ response. With shake table amplitudes between $5 \times 10^{-5}$ and $5 \times 10^{-4}$ in. p-t-p, and the frequencies in the range 20–47 Hz, signals from the motion sensing system $M_1$ of the one-component transducer $T_1$ were clearly observed and correlated with the shake table motion.

Figure 5:
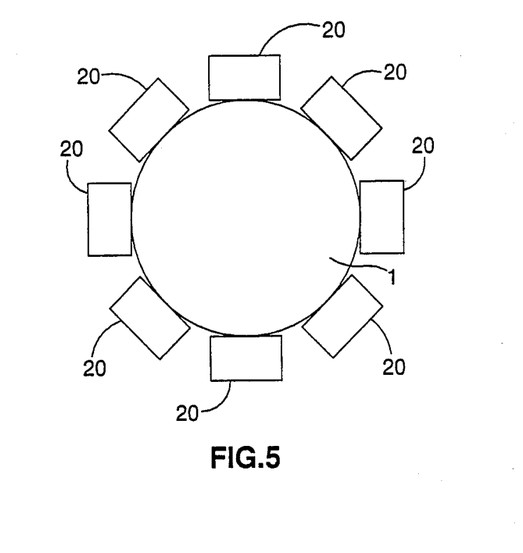
FIG. 5 is a cross-sectional representation of a transducer having a magnetic centralizing system.

During testing of the one-component transducer $T_1$, it was discovered that levitation of the inertial mass 3 with only the dipole magnet 6 can be unstable in the horizontal direction. To remedy this unstability, the magnetic system L of FIG. 4 was modified to include a magnetic centralizing system comprising a plurality of dipole magnets 20 mounted equidistant around the equator of the housing 1, as depicted in FIG. 5, to center the inertial mass 3 horizontally. Like poles of each dipole magnet 20 face inwards, and produce a magnetic field strength which increases outwards from the center of the housing 1. Therefore, if the inertial mass 3 moves horizontally to one side from its equilibrium position, it encounters greater ferrohydrodynamic pressure on the side which is closer to the housing 1, and it is forced back towards its equilibrium position.

With the centering magnets 20 and the levitating magnet 6, the one-component transducer $T_1$ can be self-leveling to some degree. That is, during field deployment, the one-component transducer $T_1$ can be less sensitive to the need to have its vertical axis aligned with true vertical than are conventional transducers.

Three-Component Test

A prototype, three-component transducer T was constructed with a housing 1 having a generally spherical cavity 5 and a spherical inertial mass 3 similar to that shown in FIG. 1. The prototype, three-component transducer T was constructed by using a ping-pong ball for the housing 1 and a solid Teflon ® sphere for the inertial mass 3. A cap was cut off the ping-pong ball, the inertial mass 3 inserted into cavity 5, the cap glued back on the housing 1, and then the cavity 5 was filled with magnetic fluid through a small hole in the cap which was later sealed. Ping-pong balls were used for the housing 1 of the prototype, three-component transducer T because they were easily and inexpensively obtained as well as having a generally consistent spherical cavity. In multicomponent transducers for field use, the housing 1 would have a thicker wall, and hence be more rigid. The one component motion sensing system $M_1$ of FIG. 4 was extended to the three-component motion sensing system M as depicted in FIG. 1. The motion sensing system M comprises pairs of circular electrodes (7a, 7b, 9a, 9b, and 11a, 11b ) on the outer surface of the housing 1 along three separate axes (Z, X, Y, respectively). Alternatively, the circular electrodes (7a, 7b, 9a, 9b, and 11a, 11b) can be attached to, or deposited on, the inside surface of the housing 1. The inertial mass 3 is coated with a conductive material 8 (e.g., silver paint). The circular electrodes (7a, 7b, 9a, 9b and 11a, 11b) were painted on the outside of the housing 1 with the same conductive material used to coat the inertial mass 3. Flexible leads were attached to the electrodes with silver conductive epoxy to transmit time-varying signals due to changes in capacitance representative of the magnitude and periodicity of relative motion of the inertial mass 3 to circuit means such as depicted in FIG. 3.

The three-component transducer T was initially tested by using only a dipole magnet 6 as shown in FIG. 1 and the same vertical shake table as described for the one-component transducer $T_1$. As with the one-component transducer $T_1$, levitation of the inertial mass 3 with only a dipole magnet 6 can be unstable in the horizontal direction. To remedy this unstability, the magnetic system L of FIG. 1 was modified to include a magnetic centralizing system comprising a plurality of dipole magnets 20 mounted equidistant around the equator of the housing 1 of the multicomponent transducer T as shown in FIG. 5 to center the inertial mass 3 horizontally. Like poles of each dipole magnet 20 face inwards, and produce a magnetic field strength which increases outwards from the center of the housing 1. Therefore, if the inertial mass 3 moves horizontally to one side from its equilibrium position, it encounters greater ferrohydrodynamic pressure on the surface which is closer to the housing 1, and it is forced back towards its equilibrium position.

With a centralizing and levitating magnet system, the spherical housing cavity 5, and the spherical inertial mass 3, the multicomponent transducer T can be self-leveling to some degree. That is, during field deployment, the multicomponent transducer T can be less sensitive to the need to have its vertical axis aligned with true vertical than are conventional transducers.

Figure 6A:
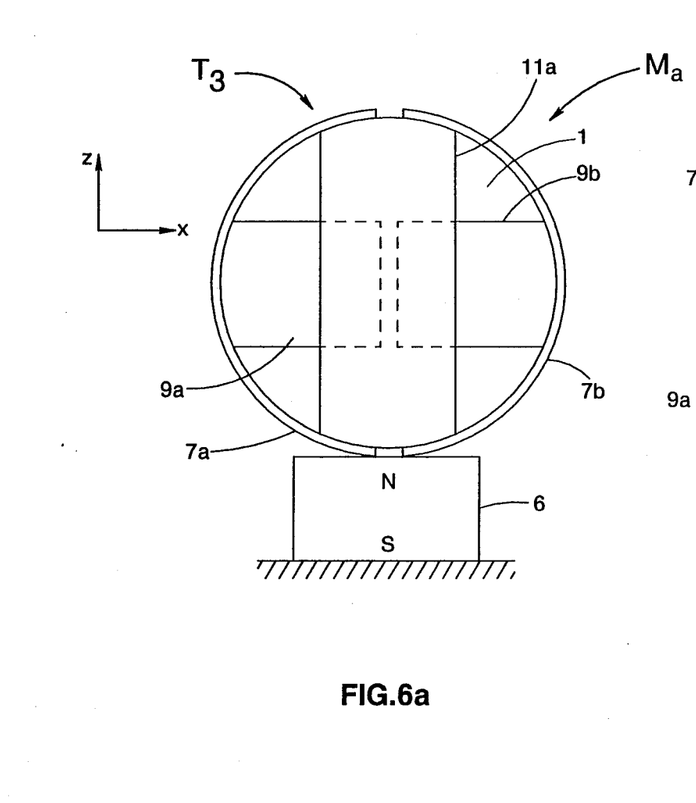
FIGS. 6a and 6b represent one embodiment of a three-component motion sensing system.
Figure 6B:
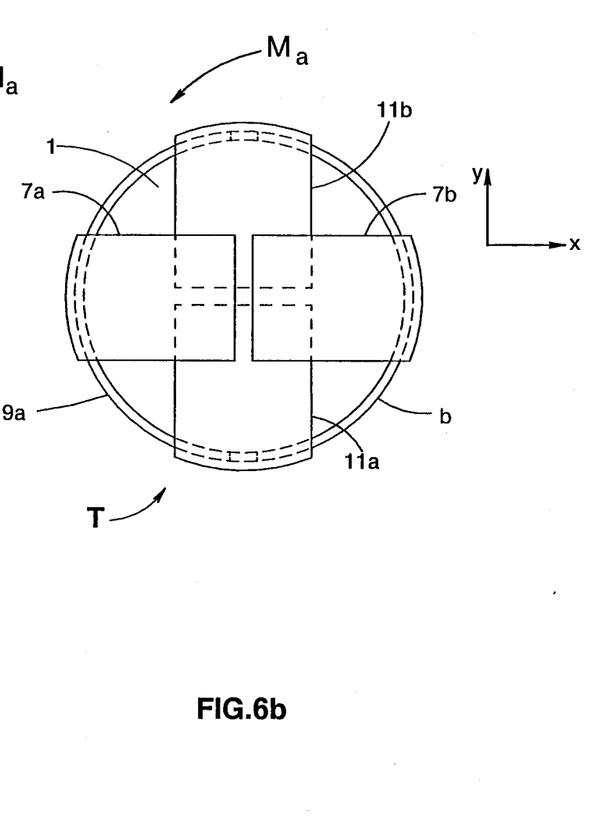

The prototype, three-component transducer T was evaluated with three separate motion sensing systems M. The first three-component motion sensing system M evaluated comprised circular electrodes, as depicted in FIG. 1, and previously discussed. The second three-component motion sensing system $M_a$, comprising overlapping, insulated rectangular electrodes, is shown in FIGS. 6a and 6b. The third three-component motion sensing system $M_b$, comprising segmented, nonoverlapping electrodes covering substantially the entire surface area of the housing, is shown in FIGS. 7a and 7b as well as in FIGS. 8a and 8b.

FIGS. 6a and 6b are exterior side and top views of the second motion sensing system $M_a$ for a three component transducer T. In FIG. 6a and 6b, the electrodes 11a and 11b mounted circumferentially with the housing 1 comprise a pair of rectangular electrodes mounted on opposing of sides of the housing 1 adapted to sense one component of motion of the inertial mass (not shown) along the X-axis. The electrodes 9a, 9b mounted circumferentially with the housing 1 comprise a pair of rectangular electrodes mounted on opposing sides of housing 1 adapted to sense one component of motion of the inertial mass along the Z-axis. Similarly, the electrodes 7a, 7b mounted circumferentially with the housing 1 comprise a pair of rectangular electrodes on opposing sides of housing 1 adapted to sense one component of motion of the inertial mass along the Y-axis. At the point any electrode overlaps another electrode, they are insulated one from the other. In the second motion sensing system $M_a$, each electrode pair (e.g., 7a, 7b) is slightly more sensitive to changes in capacitance due to motion of the inertial mass 3 parallel to the short dimension of the electrode pairs, than to motion parallel to the long dimension (e.g., electrodes 11a, 11b are slightly more sensitive to motion along the X-axis than to motion along the Y or Z axes). Although the overlapping electrodes were insulated from one another, they can be coupled by their fringing electric fields so that they have somewhat similar sensitivity to motion in any direction.

Figure 7A:
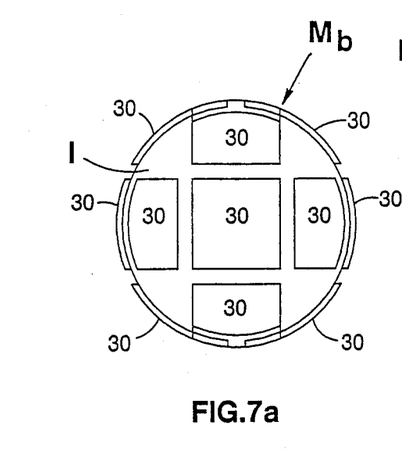
FIGS. 7a and 7b represent one embodiment of a three-component motion sensing system.
Figure 7B:
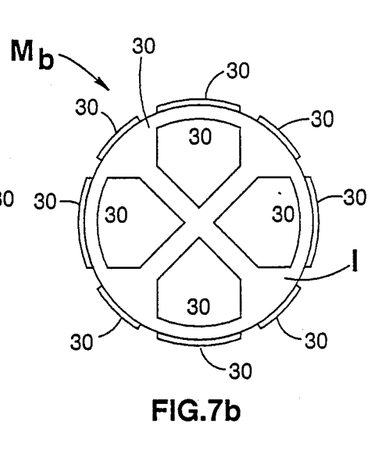
Figure 8A:
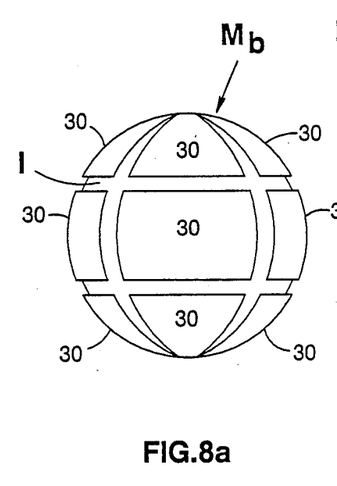
FIGS. 8a and 8b represent one embodiment of a multicomponent motion sensing system.
Figure 8B:
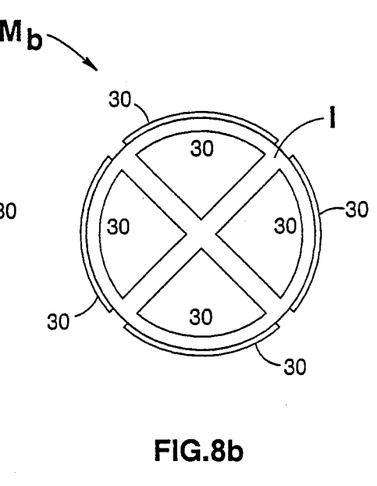

The third motion sensing system $M_b$ comprises a plurality of segmented electrodes 30 mounted over substantially the entire surface area of the housing as seen in FIGS. 7a, 7b and 8a, 8b, which are top and side views of the third motion sensing system $M_b$. Unlike the second motion sensing system $M_a$, the third motion sensing system $M_b$ comprises nonoverlapping electrodes. The segmented electrodes can have areas which are generally rectangular as seen in FIGS. 7a and 7b or lunes (i.e., areas formed by intersecting great circles) as seen in FIGS. 8a and 8b.

In the third motion sensing system $M_b$, the fringing electric fields effect can be eliminated by not overlapping the electrodes. With the plurality of segmented electrodes shown in FIGS. 7a, 7b, and 8a, 8b, one can select combinations of one or more of pairs of electrodes on opposing sides of the housing 1 to produce signals representative of the relative motion of the inertial mass along a plurality of axes.

Having described several embodiments of the multicomponent transducer T, changes and modifications thereto will become apparent to those skilled in the art. Exemplary of such changes are enhancements to the motion sensing system of the multicomponent transducer as well as improvements in the design of the inertial mass, housing, and magnetic fluid whereby improvements in the sensitivity of the multicomponent transducer can be made.

The sensitivity of a transducer is a measure of its efficiency in converting mechanical motion into an electrical signal. A transducer's sensitivity and the variations in such sensitivity as a function of frequency are two important characteristics in determining the suitability of a transducer for its intended use. In seismic exploration, transducers should be sensitive to ground velocities as low as $10^{-7}$ in./sec, operate within a frequency range of 4–500 Hz and have a sensitivity of 0.5–10 volts/in./sec.

We have conducted a testing program and have identified important parameters for designing multicomponent transducers as well as modifications which can individually and collectively enhance the sensitivity of the multicomponent transducer T.

Design Parameters

Two of the more important parameters in designing a multicomponent transducer T are its resonant frequency $f_n$ and damping factor $\delta$. The resonant frequency $f_n$ determines the regions of the multicomponent transducer's amplitude and phase versus frequency responses which fall within the frequency range in which the multicomponent transducer T is to be used. The damping factor $\delta$ determines the amount of overshoot and is a contributing factor in determining the magnitude of the amplitude and phase responses of the multicomponent transducer T. In the present invention, we have also found that the ratio r/R of the inertial mass radius r to that of the housing cavity radius R can have a fundamental effect on the sensitivity of the multicomponent transducer T and the damping factor $\delta$ as well as indirectly impact the choice of resonant frequency $f_n$. The flow of viscous magnetic fluid in the annulus between the inertial mass and housing cavity wall, when there is relative motion between them, dampens the motion of the inertial mass. The damping factor $\delta$ can be a function of the magnetic fluid viscosity and the size of the annulus between the inertial mass and the housing.

Figure 9:
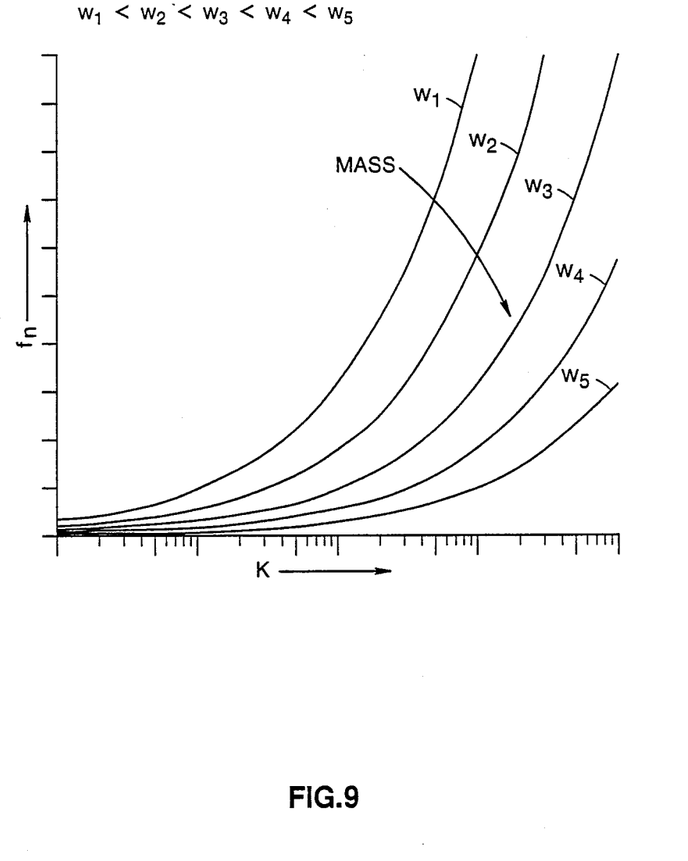
FIG. 9 is a diagram of resonant frequency $f_n$ versus effective spring constant K.

Looking now to FIG. 9, a diagram is depicted of resonant frequency $f_n$ versus effective spring constant K (for a logarithmic K axis) for different masses $w_i$ of the inertial mass of a multicomponent transducer. Each curve represents a different mass with increasing mass indicated by the arrow. The entry point to such a diagram is the desired resonant frequency $f_n$ of the multicomponent transducer T from which one can select either the desired mass of the inertial mass or effective spring constant K and the resulting effective spring constant or mass of the inertial mass is then determined, respectively.

The resonant frequency $f_n$ generally establishes either an upper or lower limit on the operational frequency range of the multicomponent transducer T since using the multicomponent transducer T at the resonant frequency $f_n$ is to be avoided. It is preferable to operate with a low resonant frequency $f_n$ and in the range of frequencies greater than the resonant frequency $f_n$ so as not to limit the range of frequency response of the multicomponent transducer T.

Figure 10:
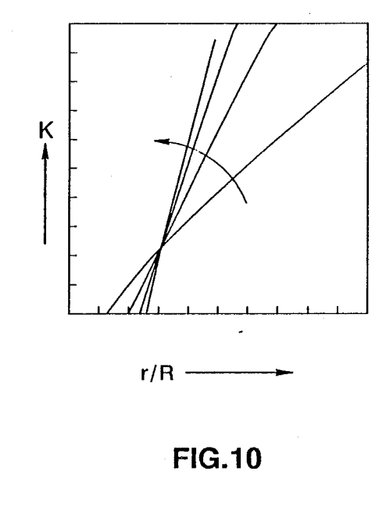
FIG. 10 is a diagram effective spring constant K versus the ration r/R for a plurality of different magnetic field strengths.

As the mass $w_i$ of the inertial mass increases, the required effective spring constant K, to maintain a desired resonant frequency $f_n$, also increases such that the magnitude of the resulting amplitude response decreases. The effective spring constant K can be affected by the strength of the applied magnetic field and the ratio r/R of the multicomponent transducer T such that increasing either the magnetic field strength or the ratio r/R increases the effective spring constant K. By way of example, FIG. 10 shows the result of changing the ratio r/R on the effective spring constant K for a plurality of magnetic field strengths, with increasing magnetic field strength indicated by the arrow.

Figure 11:
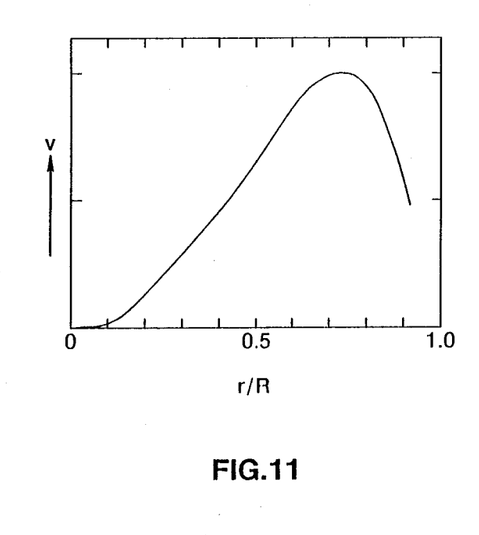
FIG. 11 is a diagram of relative velocity of the inertial mass versus the ratio r/R.

Looking now to FIG. 11, a diagram of relative velocity v of the inertial mass versus the multicomponent transducer ratio r/R is shown for fixed values of housing velocity, inertial mass weight, and magnetic fluid viscosity and density. To maximize the relative velocity v of the inertial mass, and hence the sensitivity of the multicomponent transducer, the optimum ratio for r/R appears to be ~0.7. However, in practice, the ratio r/R chosen will depend on a compromise between a low effective spring constant K and optimum damping factor $\delta$. Satisfactory operations are to be expected for multicomponent transducer ratios of $0.9 \gtrsim > r/R > \gtrsim 0.4$.

Figure 12:
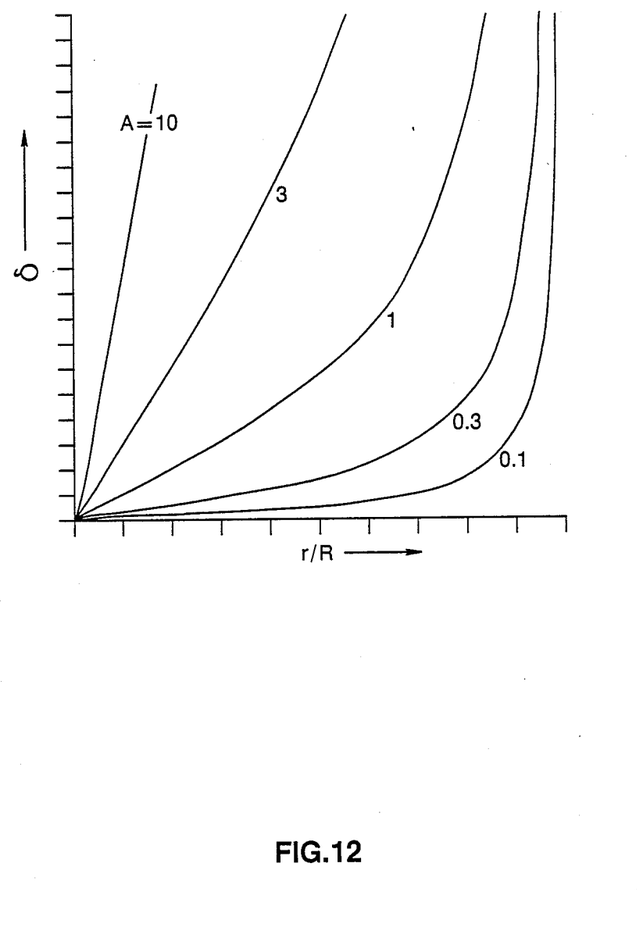
FIG. 12 is a diagram of damping factor δ versus the ratio r/R.

FIG. 12 provides a diagram of the damping factor $\delta$ versus the ratio r/R for different values of a lumped parameter A. The parameter A combines values for the radius of housing cavity, mass of the inertial mass, effective spring constant K, and viscosity of the magnetic fluid. As the inertial mass radius increases, or conversely, the housing cavity radius R decreases, the damping factor $\delta$ increases.

Magnet System

The magnetic system L for levitating and centralizing the inertial mass should generate radially symmetric ferrohydrodynamic centering forces and ferrohydrodynamic levitating forces. The magnetic system L in the prototype three-component transducer was the most expedient one which was suitable for tests on a vertical shake table, i.e., a permanent dipole magnet for levitation, and ceramic magnets mounted circumferentially with the housing for centering the inertial mass horizontally. As a result, the effective spring constants K were not the same in the horizontal and vertical directions. In practice, it is to be preferred to have the same or nearly the same, effective spring constant K in at least the X, Y, and Z directions.

Figure 13A:
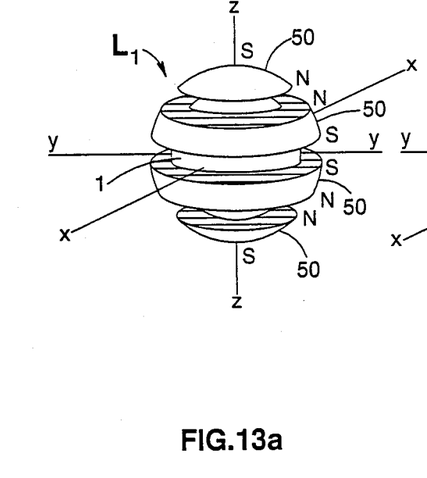
FIGS. 13a and 13b represent alternative embodiments of the magnetic system for levitating and centering the inertial mass of the multicomponent transducer.
Figure 13B:
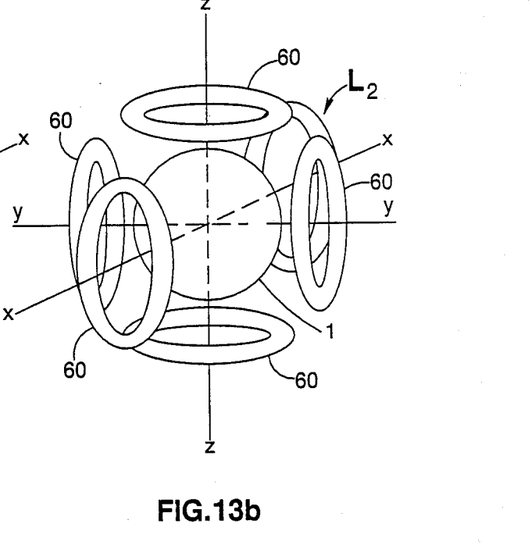

An alternative magnetic system $L_1$ comprising a plurality of ring magnets 50 mounted with the multicomponent transducer T about selected latitudes of the housing is depicted schematically in FIG. 13a. This configuration has the practical advantage that the effective spring constant K has no angular dependence, i.e., it is the same in all radial directions. Other magnetic systems $L_2$ comprising electromagnets or electromagnetic coils 60 along selected axes of the multicomponent transducer T are depicted schematically in FIG. 13b and would produce equal effective spring constants K in the directions of the axes of symmetry (e.g., the X, Y, Z axes). Additionally, the use of electromagnets or electromagnetic coils 60 provides a method for controlling the equilibrium position of the inertial mass as well as the effective spring constants and the damping factor (to the extent the magnetic fluid viscosity is magnetic field dependent). The response of the multicomponent transducer T can then be controlled, to the extent that its response is controlled by the spring constant and the damping factor. Additionally, the electromagnets or electromagnetic coils 60 can be controlled by a feedback circuit which uses the output of the motion sensing system M. This technique would produce a time-varying spring constant, which could enhance the response of the multicomponent transducer T. The electromagnets or electromagnetic coils 60 could also provide a means of temperature compensation for the multicomponent transducer T.

If the vertical axis of the multicomponent transducer T is tilted from true vertical during placement in the earth (as it often is), the equilibrium position may shift sideways. Depending on the radii of the inertial mass and housing cavity, some degree of tilt can be tolerated before the inertial mass touches the housing wall. With a magnetic system L of electromagnets or coils generating radially symmetric ferrohydrodynamics forces, and a feedback system, self-centering can be realized.

Shape of Housing Cavity and Inertial Mass

The spherical shape of the inertial mass and the housing cavity in conjunction with the radial symmetry of the levitating and centering magnetic fields are dictated by the desire that the factors which govern the motion of the inertial mass have the same effect in any direction. Spherical symmetry is important because it simplifies the viscous flow and magnetic field effects. Symmetry of the cavity, inertial mass and magnetic field results in a damping factor and effective spring constant which are as constant as possible in all directions.

Relative Radii of Inertial Mass and Housing Cavity

The difference in ferrohydrodynamic forces acting on opposite sides of the inertial mass acts like a spring constant when there is relative motion between the inertial mass and housing. As the inertial mass radius r increases relative to the radius R of the housing cavity, the magnetic field acting on the inertial mass increases, which causes the ferrohydrodynamic forces acting on it, and the effective spring constant, to increase.

As the inertial mass radius r is reduced, the viscous drag and the inertial mass's inertia decrease, and the velocity v of the inertial mass with respect to the housing approaches zero. As the inertial mass radius r approaches that of the housing cavity R (i.e., the annulus becomes very small), the viscosity of the fluid tends to prevent the inertial mass from moving and the relative velocity v again approaches zero. In between, there is an annulus size (and hence ratio r/R) where the relative velocity v is a maximum as seen in FIG. 11. The optimum radius ratio r/R appears to be ~0.7.

In practice, the ratio r/R depends on the magnitude of the damping factor $\delta$ and the effective spring constant K required in order to obtain the desired amplitude and phase response as a function of frequency. The radius ratio r/R used will correspond to a compromise between a low effective spring constant K and the optimum damping factor $\delta$. The actual radius of the housing and hence the radius of the housing cavity R will also be determined by the desired sensitivity of the motion sensing system. Requirements on the mass of the inertial mass, and hence its radius r, can also be a factor. In a preferred embodiment, as the radius of the housing and hence the radius of the housing cavity R decreases, the electrode area of the motion sensing system decreases and hence the sensitivity of the multicomponent transducer decreases. Thus, the lower limit on the electrode area, and hence on the radius of the housing cavity R (i.e., on the surface area of the housing) will be controlled by the desired sensitivity.

Number of Electrode Pairs

Three orthogonal pairs of electrodes have been described for one embodiment of the multicomponent transducer. In practice each pair of electrodes could have its own circuit to convert capacitance changes to voltage changes as shown in FIG. 3. The circuits would operate simultaneously. If a means of switching rapidly enough from one circuit to another was feasible, only one circuit would be needed.

More than three orthogonal pairs of electrodes may be required to produce signals representative of the X, Y, and Z components of motion respectively because the electrodes are slightly sensitive to relative motion of the sphere in other directions, and because in practice the multicomponent transducer will always be tilted to some degree from true vertical (i.e., the electrode pairs will not be exactly aligned with X, Y, Z axes which are referenced to the earth). Microchips can be used for the oscillators, frequency-to-voltage converters, and feedback circuits, and be incorporated with the housing so that the size of the instrument will not be increased by much.

Materials (a) Housing

The multicomponent transducer housing should be made from a rigid material and it should be nonconducting to prevent alteration of the electrode geometry resulting from the coupling of electrical fields to the housing. The housing should be nonmagnetic to prevent any shorting of the magnetic field due to the magnet system mounted with it.

(b) Magnetic Fluid

There are several types of magnetic fluids currently available, such as:

(a) ferrofluids comprising colloidal suspensions of magnetic particles (e.g., magnetite) in a metallic liquid (e.g., mercury) or nonmetallic liquid (e.g., water);

(b) paramagnetic salt solutions;

(c) pure substances (e.g., liquid oxygen); and (d) magnetic, fluidized solids.

The magnetic fluid should satisfy the following general requirements:

(a) be magnetic and liquid at operating temperatures; and (b) if colloidal, be stable for a period of years.

The preferred magnetic fluids are ferrofluids generally based on water, kerosene, or organic liquids as manufactured by Ferrofluids Corp., Nashua, NH, (the only known commercial supplier of ferrofluids). Since magnetic fluids can have different physical properties such as density, viscosity, dielectric constant, and thermal conductivity, the choice of a magnetic fluid will generally be predicated on the selection of those physical properties most appropriate for a given application of the multicomponent transducer.

(c) Inertial Mass

The inertial mass should be nonmagnetic and nonconducting. If it is magnetic, the levitating magnetic field will pass almost straight through the inertial mass. As a result, the magnetic field intensity, and hence the magnetic fluid pressure, will be almost the same above as below it. Therefore, the inertial mass will not be levitated. If the inertial mass is conductive, it will not form the spherical capacitor electrode of the type used here. A conducting inertial mass could be insulated from a spherical electrode on its surface, but due to its greater weight, it would require a different magnetic fluid of greater density, or a stronger levitating field, than required by a lighter, e.g., plastic inertial mass. A stronger field would result in a higher effective spring constant.

Several embodiments of the present invention have been described; however, it will be apparent to those skilled in the art that changes and modifications to the multicomponent transducer may be made without departing from the scope of the invention as set forth in the claims below.

What is claimed is:

1. A multicomponent transducer, comprising:
    (a) an inertial mass, wherein the inertial mass is coated with a conductive coating;
    (b) means for levitating the inertial mass, whereby the mass is responsive to motion along at least two separate axes; and
    (c) motion sensing means for sensing components of motion of the inertial mass along the separate axes, wherein the motion sensing means includes means for sensing time varying changes in capacitance resulting from the motion of the inertial mass, oscillator means for transforming the time varying capacitance into a time varying frequency; and receiver means for transforming the time varying frequency into a time varying voltage representative of the magnitude and periodicity of the motion of the inertial mass.

2. The multicomponent transducer of claim 1, wherein the inertial mass is nonmagnetic.

3. The multicomponent transducer of claim 1, wherein the inertial mass is nonconductive.

4. The multicomponent transducer of claim 1, wherein the inertial mass is spherical.

5. The multicomponent transducer of claim 1, wherein the means for levitating the inertial mass
    (a) a magnetic fluid in which the inertial mass is immersed; and
    (b) magnetic means for ferrohydrodynamically levitating the inertial mass in the magnetic 6. The multicomponent transducer of claim 5, wherein the inertial mass has a density greater than the density of the magnetic fluid.

7. The multicomponent transducer of claim 5, wherein the magnetic fluid includes a colloidal suspension of magnetic particles in a carrier fluid.

8. The multicomponent transducer of claim 5, wherein the magnetic fluid includes a colloidal suspension of ferromagnetic particles in a carrier fluid.

9. The multicomponent transducer of claim 1 further including means for centering the inertial mass horizontally.

10. The multicomponent transducer of claim 5, wherein the magnetic means for levitating the inertial mass includes magnetic means for generating a radially symmetric magnetic field.

11. The multicomponent transducer of claim 1, wherein the motion sensing system comprises capacitance sensing means for developing at least first and second signals representative of changes in capacitance along at least two axes resulting from components of motion of the inertial mass along the two axes.

12. The multicomponent transducer of claim 11 further including means for transforming the first and second signals representative of changes in capacitance into first and second signals representative of the magnitude and periodicity of the components of motion of the inertial mass along the two axes.

13. A multicomponent transducer, comprising:
   (a) an inertial mass;
   (b) means for ferrohydrodynamically levitating the inertial mass in a magnetic fluid, whereby the inertial mass is substantially unconstrained with respect to the directions of motion to which it is responsive; and
   motion sensing means for sensing selected components of the motion of the inertial mass wherein the motion sensing means includes means for sensing time varying changes in capacitance resulting from motion of the inertial mass, oscillator means for transforming the time varying capacitance into a time varying frequency; and receiver means for transforming the time varying frequency into a time varying voltage representative of the magnitude and periodicity of the motion of the inertial mass.

14. The multicomponent transducer of claim 13, wherein the inertial mass is spherical.

15. The multicomponent transducer of claim 13, wherein the magnetic means develops radially symmetric ferrohydrodynamic forces to levitate the inertial mass in the magnetic fluid.

16. The multicomponent transducer of claim 13, further including means for generating signals from changes in capacitance representative of the magnitude and periodicity of motion of the inertial mass along selected axes.

17. The multicomponent transducer of claim 13, wherein the magnetic means includes permanent magnets.

18. The multicomponent transducer of claim 13, wherein the magnetic means includes electromagnets.

19. The multicomponent transducer of claim 13, wherein the magnetic means includes electromagnetic coils.

20. The multicomponent transducer of claim 13, wherein the magnetic means includes ring magnets.

21. A multicomponent transducer, comprising:
   (a) a housing, wherein the housing includes a generally enclosed cavity;
   (b) a magnetic fluid generally filling the housing cavity;
   (c) an inertial mass immersed in the magnetic fluid-filled housing cavity;
   (d) magnetic means for levitating the inertial mass in the magnetic fluid cavity; and
   (e) motion sensing means for sensing at least two components of motion of the levitated inertial mass, wherein the motion sensing means includes a plurality of pairs of segmented electrodes covering substantially the entire surface of the housing cavity, and the motion sensing means includes means for sensing time varying changes in capacitance resulting from the motion of the inertial mass; oscillator means for transforming the time varying capacitance into a time varying frequency; and receiver means for transforming the time varying frequency into a time varying voltage representative of the magnitude and periodicity of the motion of the inertial mass.

22. The multicomponent transducer of claim 21, wherein the housing cavity is substantially spherical having a radius R.

23. The multicomponent transducer of claim 21, wherein the housing is nonmagnetic.

24. The multicomponent transducer of claim 21, wherein the housing is nonconductive.

25. The multicomponent transducer of claim 21, wherein the magnetic fluid comprises a colloidal suspension of magnetic particles in a carrier fluid.

26. The multicomponent transducer of claim 21, wherein the magnetic fluid is nonconductive.

27. The multicomponent transducer of claim 22, wherein the inertial mass is substantially spherical having a radius r.

28. The multicomponent transducer of claim 21, wherein the internal mass is nonmagnetic.

29. The multicomponent transducer of claim 21, wherein the inertial mass is nonconductive.

30. The multicomponent transducer of claim 21, wherein the inertial mass in denser than the magnetic fluid.

31. The multicomponent transducer of claim 27, wherein the ratio r/R of the inertial mass and housing cavity is $0.4 \lesssim r/R \lesssim 0.9$.

32. The multicomponent transducer of claim 21 wherein the magnetic means includes means for generating radially symmetric ferrohydrodynamic forces for levitating and centralizing the inertial mass about an equilibrium position.

33. The multicomponent transducer of claim 21 wherein each pair of electrode comprises rectangular electrodes mounted on opposing sides of the housing along selected axes.

34. The multicomponent transducer of claim 21, wherein each pair of electrodes comprises a pair of lune shaped electrodes mounted on opposing sides of the housing along selected axes.

35. The multicomponent transducer of claim 21 wherein the motion sensing system includes a metallic coating covering substantially the entire surface of the inertial mass.

36. A multicomponent transducer, comprising:
   (a) a housing, wherein the housing includes an enclosed, substantially spherical cavity of radius R;
   (b) a magnetic fluid generally filling the spherical cavity;
   (c) an inertial mass immersed in the magnetic fluid, wherein the inertial mass is substantially spherical of radius r and the ratio r/R of the inertial mass and the housing cavity is:

$$0.4 \lesssim r/R \lesssim 0.9$$

(d) means for levitating the inertial mass about an equilibrium position within the spherical cavity and means for horizontally centering the inertial mass about the equilibrium position; and
   (e) motion sensing means for sensing at least two components of motion of the inertial mass about the equilibrium position, wherein the motion sensing means includes means for sensing time varying changes in capacitance resulting from motion of the inertial mass, oscillator means for transforming the time varying capacitance into a time varying frequency and receiver means for transforming the time varying frequency into a time varying voltage representative of the magnitude and periodicity of the motion of the inertial mass.

* * * * *

UNITED STATES PATENT AND TRADEMARK OFFICE
CERTIFICATE OF CORRECTION

PATENT NO. : 4,905,517

DATED : March 6, 1990

INVENTOR(S) : Christopher Crowe, Ralph L. Cordell and Suen K. Kahng

It is certified that error appears in the above--identified patent and that said Letters Patent is hereby corrected as shown below:

Column 6, line 34, after "7a," insert --7b--.

Column 7, line 50, "in" should read --in.--; line 53, "in" should read --in.--;

Column 11, line 29, "$0.9 \gtrsim > r/R > \gtrsim 0.4$" should read --$0.9 \gtrsim r/R \gtrsim 0.4$.--.

Claim 5, line 2, after "mass" insert --includes:--;
line 6, after "magnetic" insert --fluid.--.

Signed and Sealed this

Thirty-first Day of December, 1991

*Attest:*

HARRY F. MANBECK, JR.

*Attesting Officer*  *Commissioner of Patents and Trademarks*